United States Patent [19]

Toki

[11] Patent Number: 5,109,537
[45] Date of Patent: Apr. 28, 1992

[54] TELECOMMUNICATION APPARATUS HAVING AN ID RECHECKING FUNCTION

[75] Inventor: Akio Toki, Hachiooji, Japan

[73] Assignee: Kabushiki Kaisha Toshiba, Kawasaki, Japan

[21] Appl. No.: 370,756

[22] Filed: Jun. 23, 1989

[30] Foreign Application Priority Data

Jun. 24, 1988 [JP] Japan .................. 63-156469

[51] Int. Cl.⁵ .................. H04B 1/40; H04B 1/16; H04M 11/00
[52] U.S. Cl. .................. 455/88; 455/127; 455/343; 379/62
[58] Field of Search .......... 455/127, 343, 38, 73, 455/88, 68, 343; 379/61, 62, 57, 63; 340/825.44

[56] References Cited

U.S. PATENT DOCUMENTS

| | | | |
|---|---|---|---|
| 4,323,881 | 4/1982 | Mori | 455/343 |
| 4,679,225 | 7/1987 | Higashiyama | 379/62 |
| 4,694,485 | 9/1987 | Iwase | 379/61 |
| 4,897,864 | 1/1990 | Murata et al. | 379/61 |

FOREIGN PATENT DOCUMENTS

| | | |
|---|---|---|
| 0115362 | 8/1984 | European Pat. Off. . |
| 0270680 | 6/1988 | European Pat. Off. . |
| 2052120 | 1/1981 | United Kingdom . |

*Primary Examiner*—Reinhard J. Eisenzopf
*Assistant Examiner*—Andrew Faile
*Attorney, Agent, or Firm*—Oblon, Spivak, McClelland, Maier & Neustadt

[57] ABSTRACT

A radio telecommunication apparatus is disclosed which is adapted to, prior to the transmission and reception of control data, transfer its own ID code from an external memory to an internal memory and hold it there and to read the held data which is employed for control data transmission and reception out of the internal memory upon each subsequent transmission and reception of the control data.

8 Claims, 7 Drawing Sheets

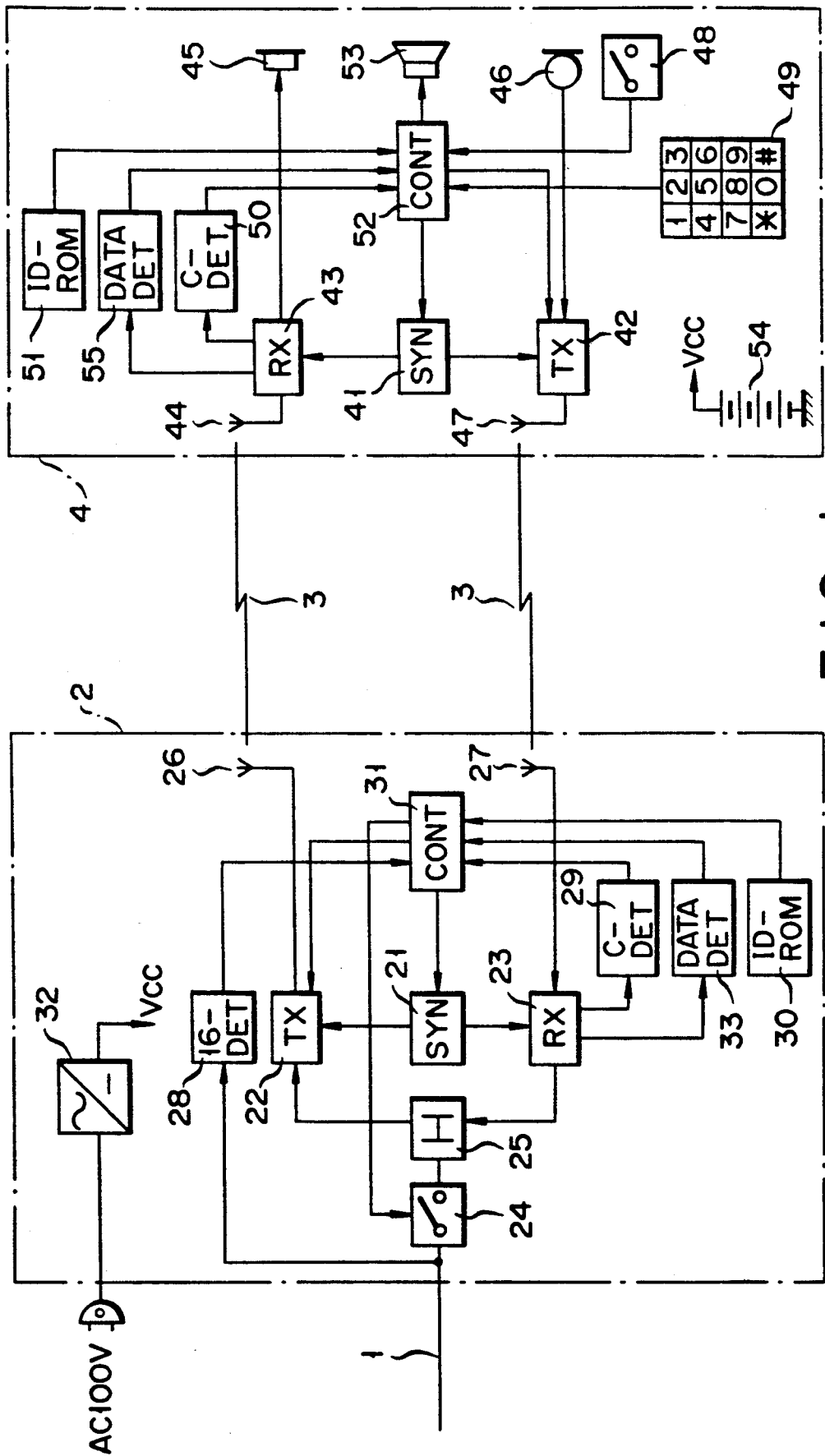
F I G. 1

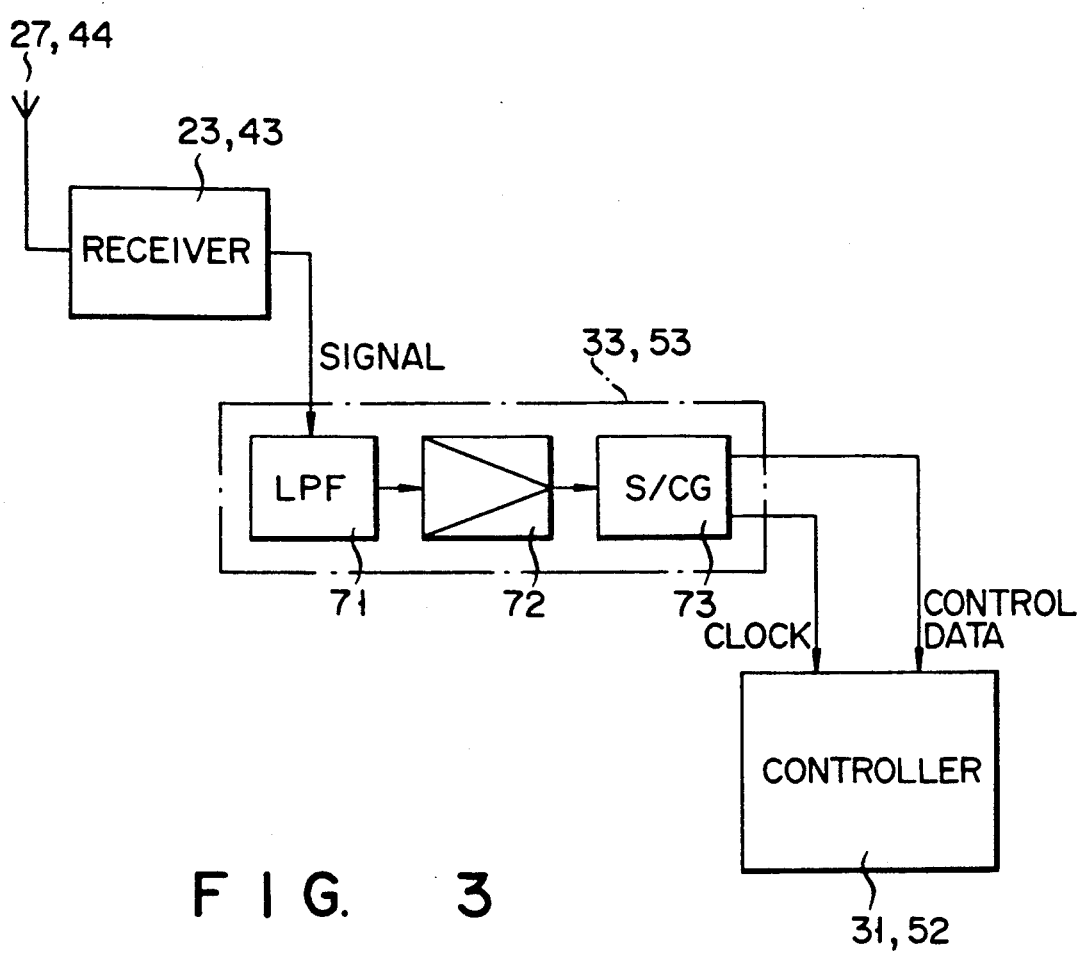
F I G. 3
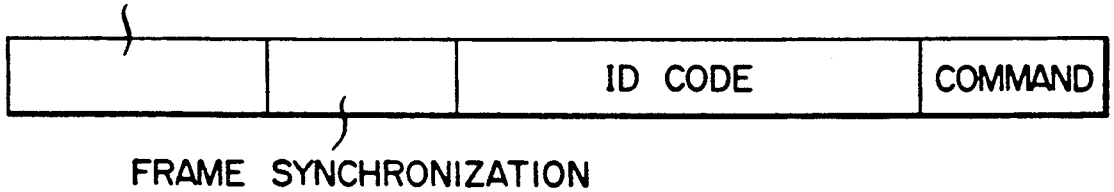
F I G. 4

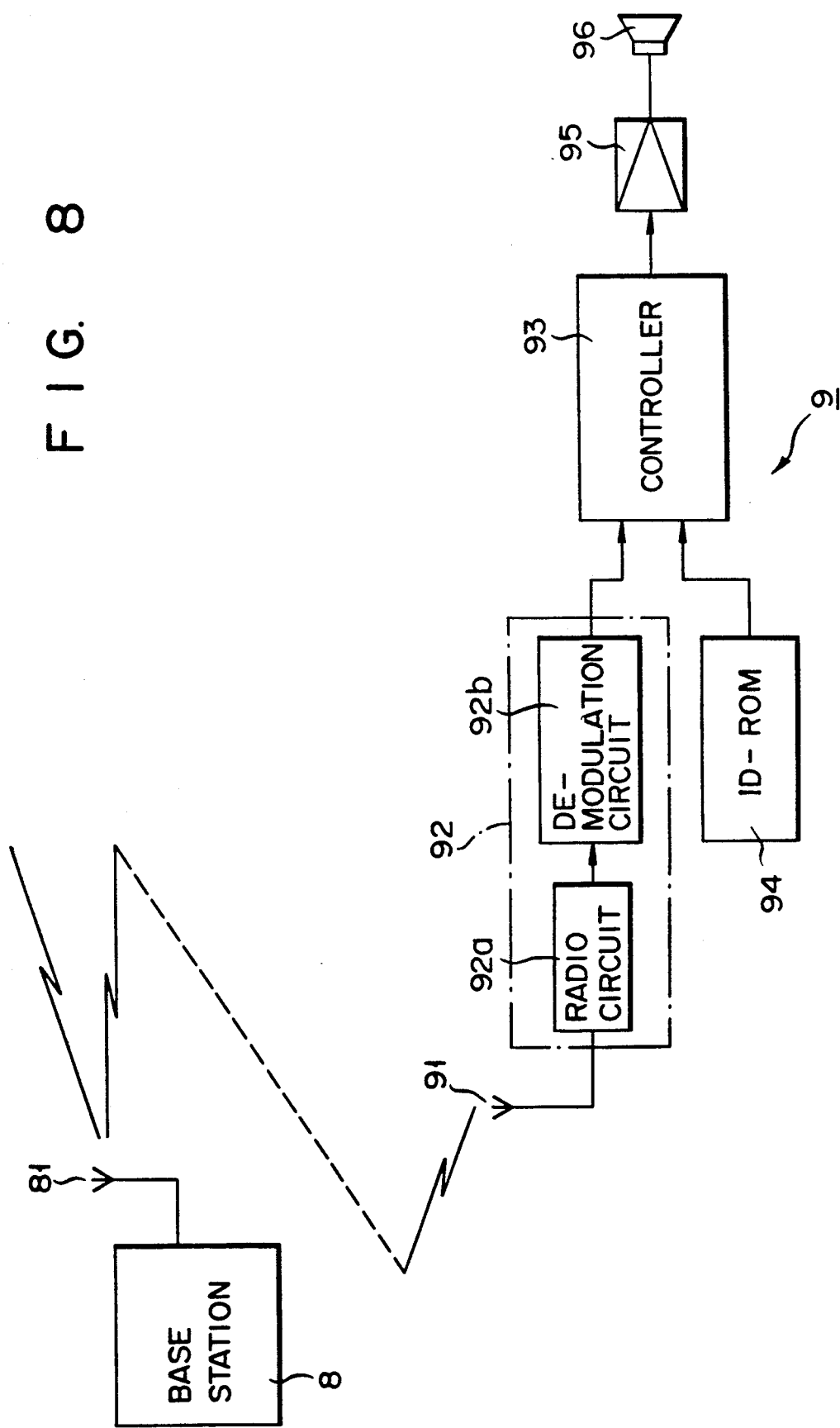

TELECOMMUNICATION APPARATUS HAVING AN ID RECHECKING FUNCTION

BACKGROUND OF THE INVENTION

1. Field of the Invention

The present invention relates to a radio telecommunication apparatus for use in a mobile radio communication system, such as cordless telephone, pagers, or a mobile telephones, which transmit an identification code at a transmitting side and which receives said signal at a receiving side for identification.

2. Description of the Related Art

A cordless telephone system comprises a fixed device connected to, for example, a subscriber's line and cordless telephone sets connected in a one-to-one correspondence to the fixed device via a radio channel. In this type of cordless telephone system it is necessary to prevent an error of a connection to other adjacent cordless telephone system. Therefore, an identification code (hereinafter referred to as an ID code) is initially allocated as its own code to the respective system. When it is desired to make a connection between a cordless telephone set and the fixed device, an ID code is transmitted from, for example, a connection-requesting side. The transmitted ID code is received at the receiving side to be compared with those initially stored ID codes for identification. Only when a coincidence occurs between the received ID code and the subscriber's own code, a connection is allowed to be established so that a message channel therebetween is accomplished.

On the other hand, a paging system comprises, for example, a base station and a plurality of pager receivers for receiving a paging signal which is sent from the base station. These pager receivers have their own ID codes allotted thereto. Upon the generation of a call request to any pager receiver, the base station inserts a corresponding ID code into the paging signal and transmits it. Each time the pager receiver receives a paging signal, it compares the ID code of the paging signal with their own initially stored ID codes for identification. If there is a coincidence therebetween, a sound is produced, informing the owner of the pager receiver that there is a call.

A conventional radio telecommunication apparatus for use in such a system includes a control circuit generally having a microcomputer and a separate ID-ROM. The ID code is initially written into the ID-ROM. Upon a transmission or identification of the ID code, the control circuit gains access to the ID-ROM and takes the ID code out of the ID-ROM.

For this reason, for each transmission or comparison of both ID codes, the conventional radio telecommunication apparatus dissipates electric power due to access of the ID-ROM. This offers a problem of a great power dissipation on the apparatus, especially in a system which has a high traffic. If a battery, in particular, is employed as a power source, then there occurs a hastened battery dissipation, a situation which is not very useful.

SUMMARY OF THE INVENTION

It is accordingly the object of the present invention to provide a radio telecommunication apparatus which can eliminate the necessity of gaining access to an external memory upon each receipt of an identification code and to reduce the dissipation power.

In order to achieve the aforementioned object, the radio telecommunication apparatus of the present invention comprises a control unit containing an internal memory to which there is random access on; external memory provided independently from the control unit to store its own identification code which is initially set, and a receiving unit for receiving a signal coming via a radio channel and detecting an identification code contained in the received signal. The control unit reads out the identification code from the external memory unit prior to the reception of the incoming signal and transfers the code to the internal memory and holds it there. Each time the receiving unit detects the identification code, the control unit reads out its own identification code from its internal memory to compare the received identification code with the read-out identification code for identification.

As a result, according to the present radio telecommunication apparatus, since the control unit initially transfers its own code from the external memory to the internal memory and holds it there, the control unit can compare, upon each receipt of the identification code, it with the identification code, at subsequent steps, to that which is held in the internal memory. It is, therefore, only necessary to have access to the external memory for each receipt of the identification code and to reduce a dissipation power In the cordless telephone set, pager receiver and so on, a battery is employed as a power source. The merit of such a reduced dissipation power assures a prolonged service life of the battery, obviating the need for recharging, or making an exchange of the battery as often.

BRIEF DESCRIPTION OF THE DRAWINGS

FIG. 1 is a block diagram showing a radio telecommunication apparatus according to one embodiment of the present invention;

FIG. 3 is a block diagram showing a data detection circuit of the apparatus of FIG. 1;

FIG. 4 shows a configuration of control data as employed in the apparatus;

FIG. 8 is a block diagram showing a radio telecommunication apparatus according to another embodiment of the present invention.

DETAILED DESCRIPTION OF THE PREFERRED EMBODIMENTS

Figure 2:
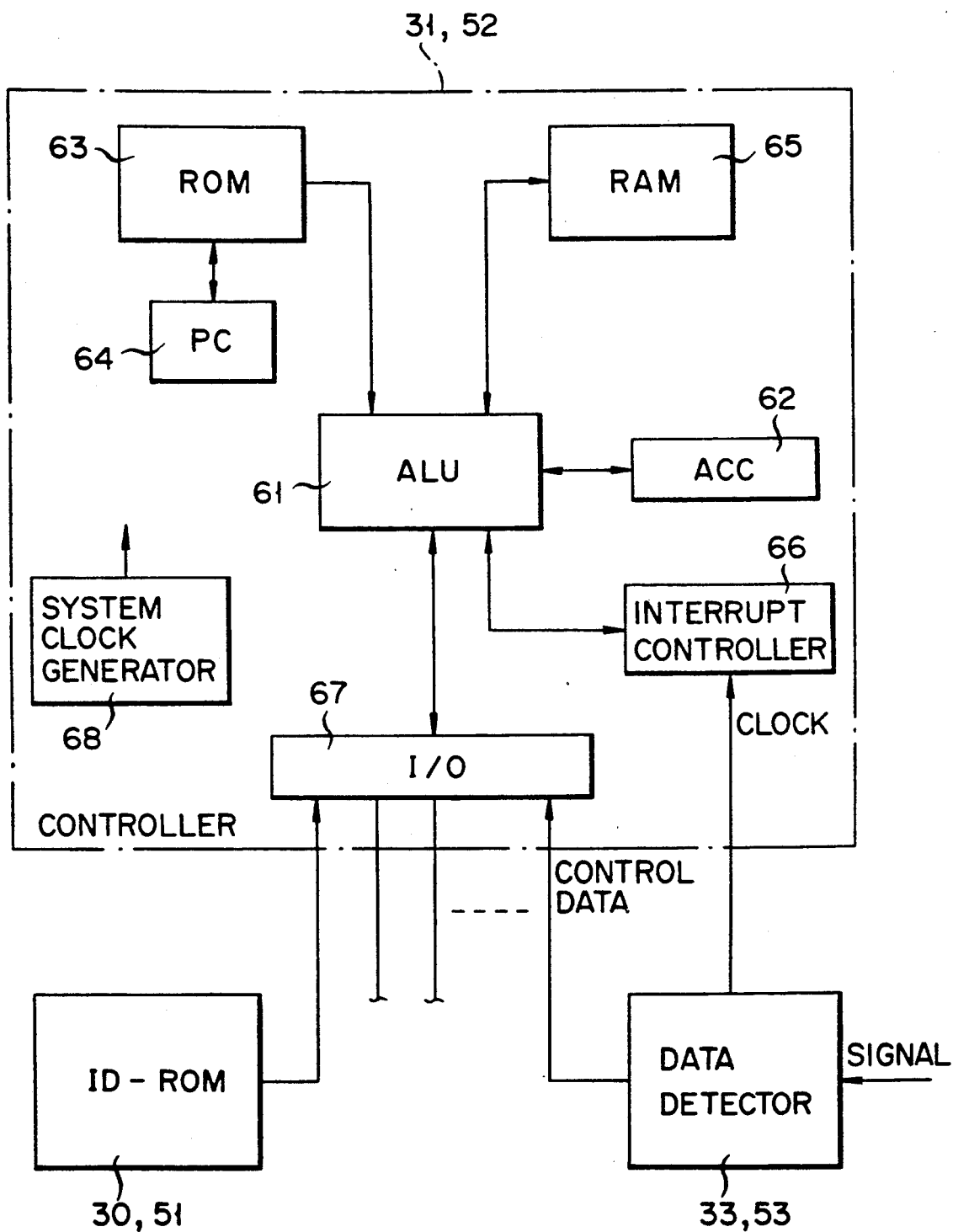
FIG. 2 is a block diagram showing an arrangement of a controller which constitutes a major section of the apparatus of FIG. 1.

One embodiment of the present invention will now be explained below with reference to the accompanying drawings.

FIG. 1 is a block diagram showing an arrangement of a cordless telephone system as will be set forth below in conjunction with this embodiment.

The cordless telephone system comprises a fixed device 2 connected to a subscriber's line 1 and a cordless telephone set 4 connected to the fixed device 2 via a radio channel 3.

The fixed device 2 comprises a synthesizer 21 and radio transmitter and radio receiver 22 and 23 for designating transmit and receive channels by the synthesizer 21. The radio transmitter 22 and radio receiver 23 are connected to a transmitting antenna 26 and receiving antenna 27, respectively. During a talking period, a talking signal which is sent from a called party's terminal, not shown, via the subscriber's line 1 passes through a line switch 24 and hybrid circuit 25 to the radio transmitter 22. The signal is sent from the transmitting antenna 26 to a radio channel 3 after it has been modulated. A talking signal which is sent from the cordless telephone set 4 via the radio channel 3 is received by the radio receiver 23 via the antenna 27. The talking signal is sent to the subscriber's circuit 1 via the hybrid circuit 25 and line switch 24.

The fixed device 2 includes various requisite circuits for making a connection between the subscriber's line 1 and a cordless telephone set 4. As the requisite circuits use is made of a ringing detection circuit 28 for detecting a 16 Hz ringing signal from an exchange equipment, not shown, via the subscriber's line 1, receiving electric field detection circuit 29 for detecting whether or not a electromagnetic wave is reached from the cordless telephone set 4, an ID code memory 30, a data detection circuit 33, for detecting control data coming from the cordless telephone set 4, and a controller 31. Of these circuits, the receiving electric field detection circuit 29 is constructed of, for example, a carrier squelch circuit or a noise squelch circuit. The ID code memory 30 is constituted by, for example, a ROM where subscriber's own ID code are stored as codes, which are initially determined by a combination of the fixed device 2 and the cordless telephone set 4.

The data detection circuit 33 is of such a type as set forth, for example, in FIG. 3. That is, a receiving signal which is output from the radio receiver 23 is first passed to a lowpass filter (LPF) 71 where a lowpass component is filtered from the received signal to extract control data's frequency component. The control data which passed through the LPF 71 is fed to a sampler/clock generator 73 after it has been amplified by an amplifier 72. The sampler/clock generator 73 extracts from the control data a clock in synchronism with the control data. FIG. 4 is one from of the control data configuration including a bit synchronizing pattern and frame synchronizing pattern in a head section, followed by an ID code and command. The command represents various types of control data, such as an calling signal and called signal. The control data synchronized passed through the sample/clock generator 73 and the clock with the control data are fed to a controller 31.

The controller 31 is constituted by a single-chip microcomputer. FIG. 2 shows one form of an internal arrangement of the controller 31. The controller 31 includes an arithmetic logic unit (ALU) 61, accumulator (ACC) 62, program ROM 63 for initially storing a control program, a program counter (PC) 64, internal RAM 65 for storing various data which are necessary for control, interrupt controller 66, I/0 port 67 for data transfer to an outside, and a system clock generator 68 for generating various system clocks necessary for the operation of the control circuit. A clock which is output from the data detection circuit 33 is supplied as an interrupt signal from the data detection circuit 33 to the interrupt controller 66. The ID code and command which are output from the data detection circuit 33 are supplied to the ALU 61 via the I/0 port 67. An ID code which is read out of the ID ROM 30 is supplied to the ALU 61 via the I/0 port 67.

Reference numeral 32 in FIG. 1 shows a rectification stabilizer circuit adapted to receive a 100 V alternating current (for example, a commercial power supply output) and to generate an operation voltage Vcc, based on the 100 V alternating current, which is necessary for the fixed device 2.

The cordless telephone set 4, like the fixed device, comprises a synthesizer 41 and radio transmitter 42 and radio receiver 3 which have their transmit/receive channels designated by the synthesizer 41. The transmitting antenna 47 and receiving antenna 44 are connected to the radio transmitter 42 and radio receiver 43, respectively. During a talking period, a radio talking signal which is sent from the fixed device 2 via the radio channel is received by the radio receiver 43 via the receiving antenna 44 and output as a call speech from a receiver 45. A talking signal which is input as a talking tone from a transmitter microphone 46 is transmitted to the transmitting antenna 47 via the radio channel 3 after it has been modulated by the radio transmitter 42.

The cordless telephone set includes not only the fixed device 2 but also various circuits necessary for the exchange equipment, not shown.

As the various circuits as set forth above, use is made of a receiving electric field detection circuit 50 for detecting whether or not an electromagnetic wave is received from the fixed device 2, ID ROM 51, data detection circuit 55 for detecting control data sent from the fixed device 2, and controller 52. Of these circuits, the receiving electric field detection circuit 50 is constituted by, for example, a carrier squelch circuit or a noise squelch circuit. The ID ROM 51 stores an ID code as its own code which is initially determined by a combination of the fixed device 2 and cordless telephone set 4. The data detection circuit 55 and controller 52 have the same arrangement as that of the data detection circuit 33 and controller 31 in the aforementioned fixed device 2.

In FIG. 1, reference numerals 48 and 49 represent a calling switch and dial key, respectively, which are necessary for a call. 53 shows a sounder for producing a dial tone when a call is received. The cordless telephone set 4 includes a battery 54. As the battery 54, use is made of, for example, a primary battery and optionally a rechargeable secondary battery.

The operation of the cordless telephone system thus arranged will be described below.

Figure 5:
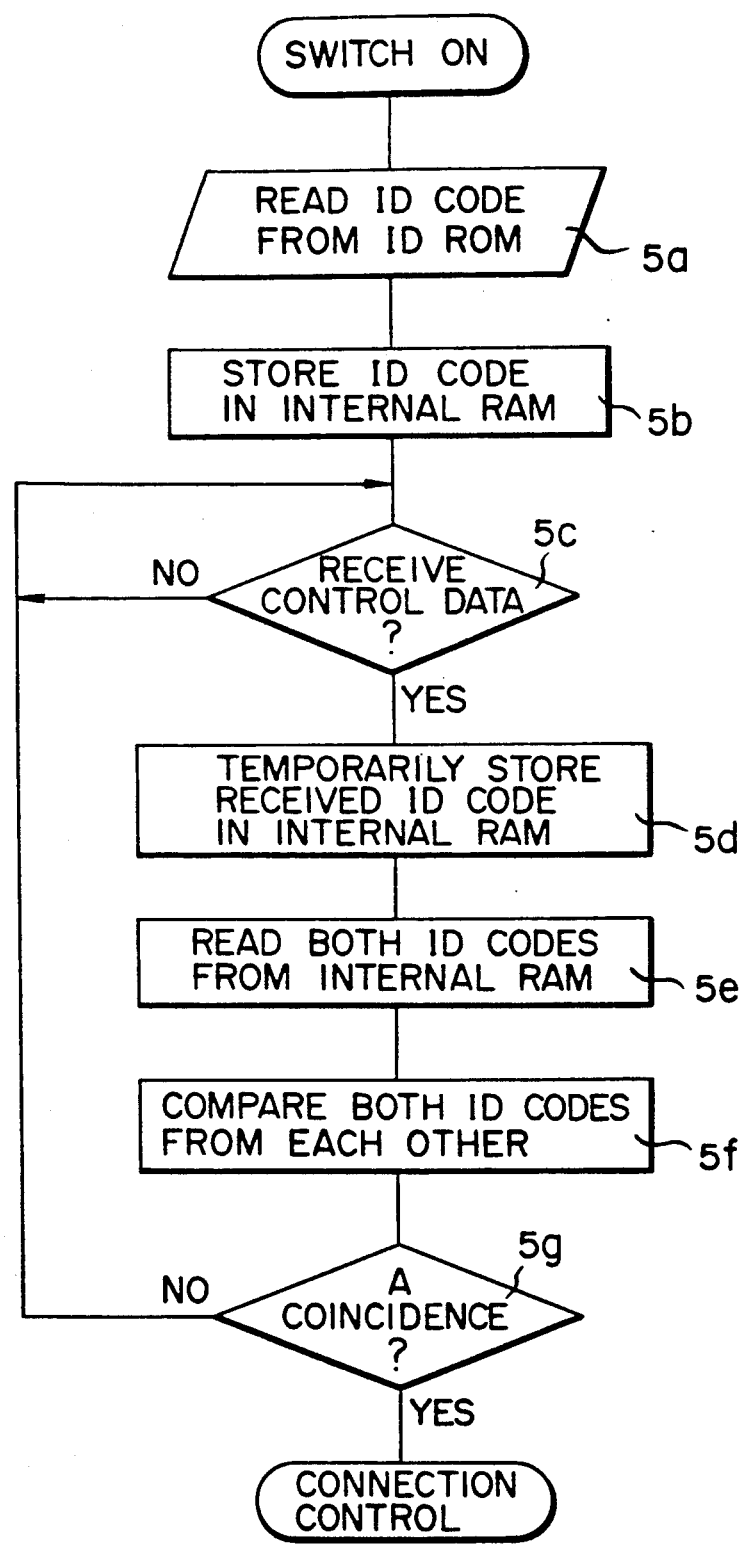
FIG. 5 is a flowchart showing a control procedure and control contents of the controller in the apparatus of FIG. 1

When a power source switch, not shown, in the fixed device 2 is turned ON, the controller 31 is initialized and there is an access to an ID ROM 30 at step 5a as shown, for example, in FIG. 5, allowing a corresponding ID code to be read out of the ID ROM 30. The ID code is transferred to the RA 65 in the controller 31 and stored at step 5b in the internal RAM 65 at an initially determined address location. When the transfer of the ID code is terminated, the controller 31 monitors whether or not a call is detected and, at the same time, monitors whether or not the control data is received.

Even when the power switch in the cordless telephone set 4 is turned ON, the transfer of the ID code is carried out as in the case of the fixed device 2. That is, the controller 52 is initialized and, at step 5a, accesses to ID ROM 51, allowing the ID code to be read out of the ID ROM 51. The ID code is transferred to the internal RAM 65 in the controller 52 and stored in the internal RAM 65 in the controller 52. Upon the completion of the transfer of the ID code, the controller 52 monitors whether or not a transmit operation is effected and, at the same time, monitors whether or not control data is sent from the fixed device 2 at step 5c.

That is, in the fixed device 2 and cordless telephone set 4, the ID code is transferred from the ID ROM 51 in the external memory to the internal RAM 65 with the respective power source ON, bringing about a holding state in readiness for a calling signal and called signal.

Now suppose that a ringing signal of 16 Hz comes from an exchange equipment, not shown, with the aforementioned state. In the fixed device 2, a ringing detection signal is output from the ringing detection circuit 28 to the controller 31. The controller 31 sends, to the synthesizer 21, a channel control signal for setting the transmit and receive channels of the radio transmitter 22 and radio receiver 23. For this reason, the synthesizer 21 delivers a local oscillation signal corresponding to the channel control signal to the radio transmitter 22 and radio receiver 23, thus bringing the latter to an operation state. When the channel setting is completed, the controller 31 allows the ID code which is initially stored in the internal RAM 65 to be read out and prepares control data which contains the ID code and a command representing that there is a ringing. The control data is supplied to the radio transmitter 22 which in turn transmits it to the cordless telephone set 4.

In the cordless telephone set 4, the radio receiver 43 is operated, in an intermittent fashion, in a readiness for a transmit signal. In this case it is to be noted that the intermittent operation is performed, for example, in a one-second receive/several-seconds stop mode to reduce the dissipation power. When an electromagnetic wave comes from the fixed device 2, it is received by the radio receiver 43 in the cordless telephone set 4 and sent to the receiving electric field detection circuit 50. A detection signal is output from the detection circuit 50 to the controller 52. The controller 52 is responsive to the detection signal to place the radio receiver 43 in a continuous reception state. If, in this state, the control data comes from the fixed device 2, it is sent via the radio receiver 43 to the data detection circuit 55. The data detection circuit 55 generates a clock pulse upon receipt of the control data and supplies this pulse to the interrupt controller 66 in the controller 52. The ID code and command are detected from the control data.

At this time, the controller 52 monitors whether or not the control data is received at step 5c as shown in FIG. 5. When the clock is received at the interrupt controller 66, the controller 52 determines that the control data is received and control is implemented for the ID code to be identified as will be set forth below. That is, at step 5d, the ID code is input from the data detection circuit 55 to the internal RAM 65 where it is temporarily stored at its predetermined address location. At step 5e, the ID code and ID code, which is initially transferred to the internal RAM 65, are read out of the internal RAM 65. At step 5f, both the ID codes are compared with each other. If there occurs a coincidence as a result of comparison, the controller 52 determines that the control data of its own is received and implements a subsequent connection control operation. If, on the other hand, there is no coincidence, the controller 52 determines that no control data of its own is received. A return is made to a ready operation at step 5c.

That is, upon each receipt of control data, the controller 52 in the cordless telephone set 4 allows its own ID code to be read out of its own internal RAM 65 for comparison with the received ID code.

Upon a coincidence between the received ID code and the ID code of the controller 52, a connection operation occurs as will be set forth below, for instance. That is, the controller 52 in the cordless telephone set 4 designates the transmit and receive channels to the synthesizer 41, placing the radio transmitter 42 and radio receiver 43 in a continuous operation state. The cordless telephone set 4 sends the control data having a command representing a "response" call back to the fixed device 2. A calling tone is thus generated from the sounder 53, informing the owner that there is a call. If, at this time, the owner answers to this call by turning the transmit switch 48 ON, the controller 52 sends the control data having a command representing this answer to the fixed device 2. When the control data having the answer command inserted therein is returned from the cordless telephone set 4, the controller 31 in the fixed device 2 generates a control signal to turn the line switch 24 ON. As a result, a connection is established between the cordless telephone set 4 and the subscriber's line 1, allowing a telephone conversation to be made between the "calling" telephone set and the cordless telephone set 4.

If, in the ready state, the owner turns the calling switch 48 of the cordless telephone set 4 ON, then the controller 52 of the cordless telephone set 4 sends a control signal designating specified transmit and receive channels to the synthesizer 41. For this reason, a local oscillation signal corresponding to the transmit and receive channels are output from the synthesizer 41. As a result, the radio transmitter 42 and radio receiver 43 are placed by the specified transmit and receive channels in a continuous transmit/receive state. Then the controller 52 allows its own ID code to be read out of the internal RAM 65, preparing control data with the ID code and calling command inserted therein. The control data is supplied via the radio transmitter 42 to the fixed device 2.

That is, the controller 52 in the cordless telephone set 4 has its own ID code read out of the internal RAM 65 even when the control data is transmitted.

In the ready state, the controller 31 in the fixed device 2 monitors whether or not an electromagnetic wave comes from the cordless telephone set 4 by a detection signal of the receiving electric field detection circuit 30. If the detection signal of the electromagnetic wave is output from the receiving electric field detection circuit 30, step 5c monitors whether or not the control data is received. That is, the control data which is sent from the cordless telephone set 4 is conducted via the radio receiver 23 to the data detection circuit 33. The data detection circuit 33 generates a clock in synchronization with the control data and supplies it to the interrupt controller 66 in the controller 31. The ID code and transmit command are detected based on the control data. When the clock pulse is received as an input to the interrupt controller 66, the controller 31 determines that the control data arrives, receives a received ID code from the data detection circuit 33 and stores it once in the predetermined address location of the internal RAM 65 at step 5d. The controller allows its own ID code and the receiving ID code from the internal RAM 65 to be read out and compares their ID codes with each other for identification. If, as a result of comparison, there is a coincidence, the controller 31 determines that a calling request is made from its own cordless telephone set and implements a subsequent connection operation. If, on the other hand, there is no coincidence, the controller 31 determines that control data is sent from another cordless telephone set, bringing itself back to a ready state at step 5c.

That is, the controller 31 of the fixed device 2, like the controller 52 of the cordless telephone set 4, allows its own ID code to be read out of the internal RAM 65 and compares it with the received I code for identification.

If, as a result of comparison, there is a coincidence between the read-out ID code and the received I code, for example, the following connection operation is performed between the fixed device 2 and the cordless telephone set 4. That is, the controller 31 of the fixed device 2 prepares control data having a call response command inserted therein and control data for designating the transmit and receive channels for a call. The radio transmitter 22 transmits these control data toward the cordless telephone set 4. Then the controller 31 outputs a control signal for turning the line switch 24 ON. As a result, the line switch 24 is turned ON, establishing a DC loop relative to the subscriber's line 1. When, on the other hand, the controller 52 of the cordless telephone set 4 receives the control data having the aforementioned call response command as well as the control data for designating the transmit and receive channels, it supplies a control signal for setting the transmit and receive channels, which are designated by the received control data to the radio transmitter 42 and radio receiver 43, to the synthesizer 41. For this reason, the radio transmitter 42 and radio receiver 43 are placed by the transmit and receive channels in a continuous operation state. If, in this state, the owner of the cordless telephone set 4 inputs the telephone number of the calling party terminal via the dial key 49, then the controller 52 transmits corresponding data from the radio transmitter 42 toward the fixed device 2. By doing so, the controller 31 of the fixed device 2 controls the line switch 24 in ON-OFF fashion in accordance with the telephone number data. For this reason, a corresponding dial pulse is sent to the exchange equipment, not shown, and the exchange equipment performs a switching connection operation in accordance with the dial pulse. If an off-hook response is made on the calling party terminal, a speech path is established between the party terminal and the cordless telephone set 4 so that a telephone conversation can be made over the speech channel.

The radio telecommunication system of the present invention is such that, in the fixed device 2 and cordless telephone set 4, the ID code which is stored in the ID ROM (31, 51) is transferred to the internal RAM 65 in the controller (31, 52) at the turn on time of the power source and held there. If the control data is received at the calling or called time, the received ID code is compared with the ID code which is held in the internal RAM 65. For this reason, it is not necessary to read out the ID code by gaining access to the ID ROM (30, 51) as an external memory each time the control data is received. As a result, it is possible to reduce a dissipation current resulting from the ID ROM (30, 51) and hence to reduce a dissipation power in the apparatus. If a battery 54 is employed as a power source as in the case of the cordless telephone set 4, the battery life can be extended, thus obviating the necessity of recharging or replacing it as often.

According to the present embodiment, the ID code is read out of the internal RAM 65 in the control circuit (31, 52) when the control data is either received or transmitted. For this reason, the dissipation power of the apparatus can be reduced even when the control data is transmitted.

Figure 6:
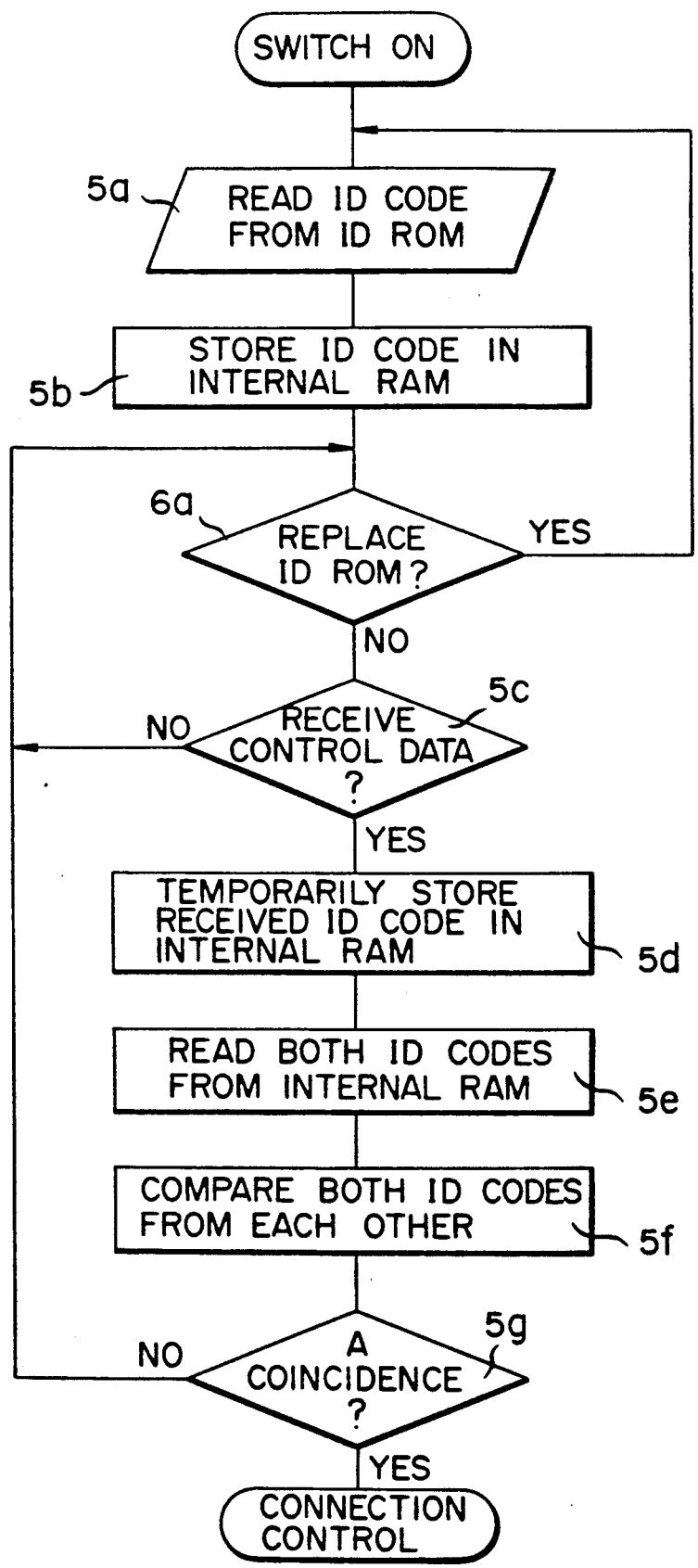
FIGS. 6 and 7 are flowcharts showing a modified form of the control procedure and control contents of FIG. 5.

Various changes or modifications of the present invention may be made as will be set forth below. That is, the ID code which is stored in the ID ROM (30, 50) may be transferred to the internal RAM 65 in the controller (31, 52) either when the power source is turned ON or when an exchange is made for the ID ROM (30, 51). FIG. 6 is a flowchart showing the control procedure and control contents of the controller (31, 52) in a modified form. In FIG. 6, the same reference numerals are employed to designate the same portions corresponding to those shown in FIG. 5. Further detailed explanation is, therefore, omitted. The controller (31, 52) monitors whether or not, in the ready state, the control data is received at step 5a and monitors whether or not an exchange is made for the ID ROM (30, 51) at step 6a. If, in use, an exchange is made for the ID ROM (30, 51) by a change, etc., of the ID code, the controller (31, 52) detects that exchange and implements steps 5a and 5b. For this exchange, the ID code which is held in the internal RAM 65 in the controller (31, 52) is automatically replaced by a new ID code. By the use of the new ID code, a comparison with the received ID code and transfer of control data can always be performed according to the embodiment of the present invention. The exchange of the ID ROM can be detected by, for example, providing a sensor on the socket of the ID ROM to monitor the attachment and detachment of the ID ROM or periodically reading storage data out of the ID ROM and comparing it with the ID code which is held in the internal RAM 65.

Figure 7:
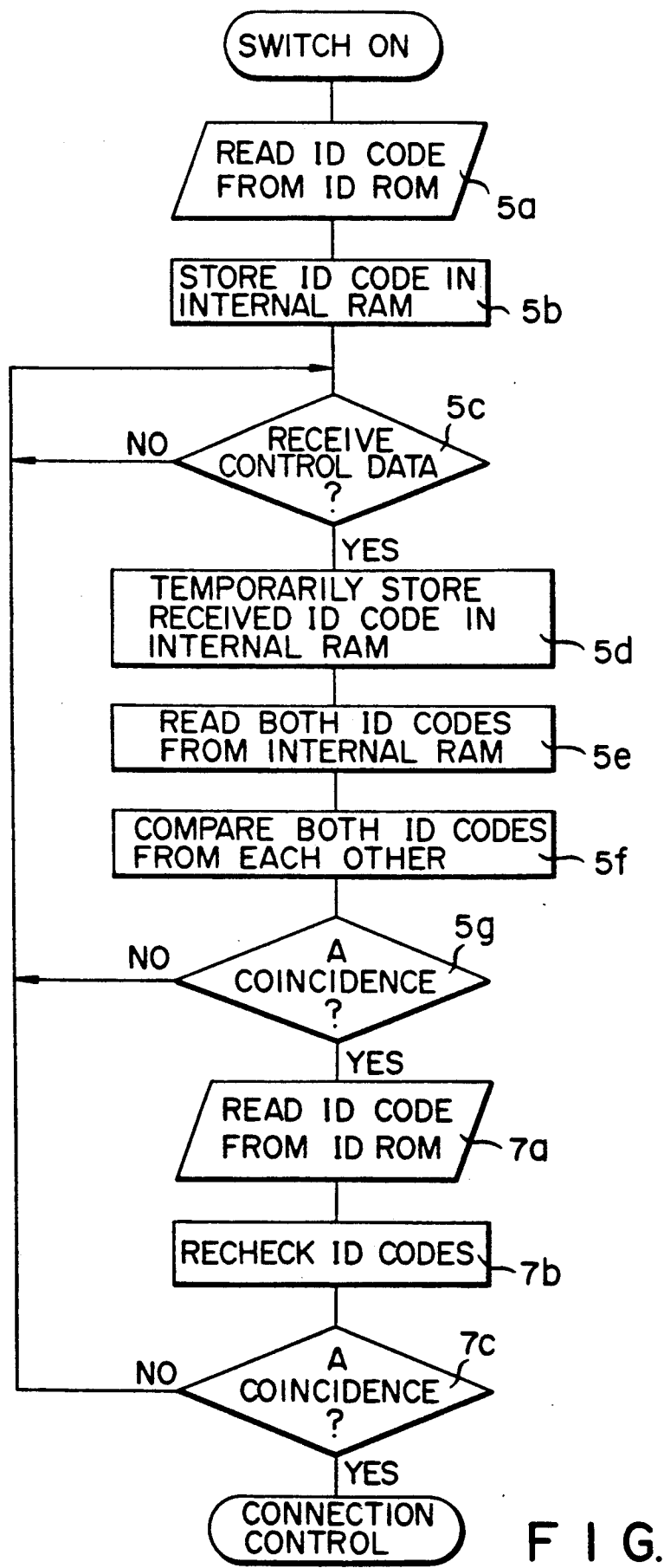

In a alternative embodiment the present invention, a change in the contents of the ID ROM (30, 51), that is, an exchange, removal, etc., of the ID ROM are not monitored. Instead, if a coincidence occurs as a result of comparison between the ID code in the internal RAM 65 of the controller (31, 52) and a received ID code, it may be possible to read the ID code out of the ID ROM (30, 51) so that it may be rechecked against the received ID code. FIG. 7 shows flowchart showing the control procedure and control contents of a controller (31, 52) in this modification. In FIG. 7, the same reference numerals are employed to designate portions corresponding to those shown in FIG. 5. Further explanation is, therefore, omitted for clarity.

When the controller (31, 52) detects, at step 7g, a coincidence between the received ID code and an ID code which is held in the internal RAM 65, control is shifted to step 7a. At step 7a, access is gained to the ID ROM (30, 51) to read the ID code out of the ID ROM (30, 51) and, at step 7b, rechecking is made between that ID code and the received ID code. When, as a result of rechecking, a coincidence is detected between both the ID codes at step 7c, the controller (31, 52) determines for the first time that its own control data comes and makes a transfer to connection control. If, on the other hand, an exchange, etc., are made for the ID ROM (30, 51) during use so that the aforementioned ID code is different from the ID code which is held in the internal RAM 65, then a non-coincidence is detected between both the ID codes at step 7c following step 7b. In this case, the controller (31, 52) determines that the coming control data is not its own data, returning control back to a ready state.

If an exchange is made for the ID ROM (30, 51) during use instead of in the ready state, then a comparison is made based on a new ID code. This can obviate the necessity for providing any sensor for monitoring an exchange of the ID ROM (30, 51). It is, thus, possible to obtain a simpler circuit arrangement. Furthermore, since there is no need to periodically read storage contents out of the ID ROM (30, 51) for comparison with the ID code which is held in the internal RAM 65, it is possible to reduce a dissipation power to that extent. In the present modification, access is made to the ID ROM (30, 51) for rechecking. The aforementioned access is made only when a coincidence occurs between the received ID code and the ID code in the internal RAM 65, that is, only when the controller receives its own control data. For this reason, it is possible to decrease the power dissipation for rechecking, upon comparison with a conventional case where access is made to the ID ROM each time the control data is received.

In the case where the ID ROM (30, 51) is removed during use, it will be necessary that control not be shifted to connection control even if any ID code comes. According to the present invention, even if there is a coincidence between the received ID code and the ID code in the internal RAM 65, the controller can determine that no signal is received at the time of rechecking so that control is not shifted to the connection control.

Another embodiment of the present invention will be explained below with reference to FIG. 8.

This embodiment is applied to a pager receiver of a paging system. The paging system comprises a base station 8 for sending a paging signal and pager receiver 9. If a call request is transferred from an exchange equipment, not shown, toward any pager receiver, a paging signal with a ID code inserted therein to correspond to the pager receiver is transmitted from an antenna 81.

The pager receiver 9 receives the paging signal at a receiving circuit 92 from the base station via an antenna 91. The receiving circuit 92 comprises a radio circuit 92a and demodulation circuit 92b. After being received by the radio circuit 92a, the paging signal is demodulated at the demodulation circuit 92b. The paging signal thus demodulated is sent to a controller 93. The controller 93 has a microcomputer as a main control section and is of substantially the same type as shown in FIG. 2. The controller 93 further has an internal RAM 65. The controller 93 gains access to an ID ROM 94, when a power source is turned ON, and reads out its own ID code initially stored in the ID ROM 94 and sends it to the internal RAM 65 where it is stored. When, thereafter, a paging signal is received by the receiving circuit 92, an ID code which is inserted into the paging signal is compared with the ID code which is held in its own internal RAM 65. Where a coincidence occurs between both ID codes, the controller 93 determines that its own call comes and supplies it to a speaker 96 via a drive circuit 95. A sound is produced from the speaker 96, informing the owner that there is a call.

That is, the pager receiver of the present embodiment transfers an ID code in the ID ROM 94 to the internal RAM 65 in the controller 93 at the time of turning the power source ON and holds it there. Upon each receipt of the paging signal, the controller compares the received ID code which is inserted into the paging signal with its own ID code which is held in the internal RAM 65. Therefore, it is not necessary to gain access to the ID ROM (external memory) 94. It is thus possible to reduce a current dissipation which is caused at the pager receiver upon comparison between both ID codes and hence to reduce a power dissipation at the pager receiver. By doing so, a life of the battery which is a power source for the selective pager receiver can be prolonged with a consequent economic advantage.

The present invention is not restricted to the aforementioned embodiments and modifications. For example, an ID code may be transferred from the ID ROM to the internal RAM in the controller either not only upon the turning ON of the power source and upon the exchange for the ID ROM or but also upon the first receipt of control data in the ready state or upon the first transmission of control data. By doing so, access is made to the ID ROM only upon the first transmission of the control data or upon the first receipt of the control data and a subsequent control operation is performed with the use of the ID code which is held in the internal RAM of the controller. For this reason, it is possible to largely reduce the power dissipation of the present apparatus upon comparison with a conventional apparatus which is adapted to always read an ID code from an ID ROM in the aforementioned case. Various changes or modifications of the present invention may be made without departing from the spirit and scope of the present invention by changing, for example, the timing of a transfer from an external memory means, transfer procedure, arrangement of the apparatus and so on.

What is claimed is:

1. A radio telecommunication apparatus comprising:
control means including internal memory means to which random access is gained;
external memory means provided independently of said control means to store a first identification code which is initially set thereto; and
radio receiving means for receiving a signal coming from a radio channel and for detecting a second identification code which is contained in the coming signal; where
said control means comprises means for reading the first identification code out of said external memory means prior to the reception of the coming signal and for transferring said first identification code to said internal memory means and holding said first identification code there, and means for reading said first identification code out of said internal memory means for each detection of the second identification code by said radio receiving means and comparing the second identification code detected by said radio receiving means with said first identification code read out from said internal memory means to confirm a coincide between said first and second identification codes, said control means further including means for reading at least one identification code out of said external memory means to compare said one identification code with said second identification code for rechecking, only upon the detection of a coincidence between the second identification code detected by said radio receiving means and said first identification code.

2. A radio telecommunication apparatus having power source means, according to claim 1, wherein said control means, responsive to the turning ON of said power source means, reads said first identification code out of said external memory means and for transferring said first identification code to said internal memory means and holding said first identification code there.

3. A radio telecommunication apparatus according to claim 1, wherein said control means further comprises means for monitoring whether or not said first identification code stored in said external memory means is changed and means for, upon the detection of that change, reading said first identification code and for transferring said first identification code to said internal memory means and holding said first identification code there.

4. A radio telecommunication apparatus provided in a cordless telephone set which is included in a cordless telephone system having a fixed device connected to a subscriber's line and the cordless telephone set connected to the fixed device via a radio channel, said apparatus comprising:
control means including internal memory means to which random access is gained;
external memory means, provided independently of the control means, for storing a first identification code which is initially set thereto; and
radio receiving means for receiving control data coming from the fixed device via the radio channel and for detecting a second identification code in the control data, wherein
said control means comprises means for, prior to the reception of the control data, reading said first identification code out of said external memory means and for transferring said first identification code to said internal memory means and holding said first identification code there, and means for, upon each detection of the second identification code by the radio receiving means, reading the first identification code out of said internal memory means to compare the second identification code detected by said radio receiving means with said read-out first identification code, thereby confirming a coincide between said first and second identification codes, said control means further including means for reading at least one identification code out of said external memory means to compare said one identification code with said second identification code for rechecking, only upon the detection of a coincidence between the second identification code detected by said radio receiving means and said first identification code.

5. A radio telecommunication apparatus provided in a fixed device which is included in a cordless telephone system having the fixed device connected to a subscriber's line and a cordless telephone set connected to the fixed device via a radio channel, said apparatus comprising:
control means including internal memory means to which random access is gained;
external memory means, provided independently of said control means, for storing a first identification code which is initially set thereto; and
radio receiving means for receiving control data coming from said cordless telephone set via the radio channel and for detecting a second identification code in the control data, wherein said control means comprises means for, prior to the reception of the control data, reading said first identification code out of said external memory means and for transferring said first identification code to an internal memory means and holding said first identification code there and means for, upon each detection of the second identification code by said radio receiving means, reading said first identification code out of said internal memory means to compare the second identification code detected by said radio receiving means with said first identification code, thereby confirming a coincide between said first and second identification codes, said control means further including means for reading at least one identification code out of said external memory means to compare said one identification code with said second identification code for rechecking, only upon the detection of a coincidence between the second identification code detected by said radio receiving means and said first identification code.

6. A radio telecommunication apparatus provided in a pager receiver which is included in a paging system having a base station for transmitting a paging signal containing a first identification code and a plurality of pager receivers for receiving the paging signal which is transmitted from the base station, said apparatus comprising:
control means including internal memory means to which random access is gained;
external memory means, provided independently of said control means, for storing a second identification code which is initially set thereto; and
radio receiving means for receiving the paging signal coming from the base station and for detecting the first identification code which is contained in the paging signal, wherein
said control means comprises means for, prior to the reception of the paging signal, reading said second identification code out of said external memory means and for transferring said second identification code to said internal memory means and holding said second identification code there, and means for, upon each detection of the first identification code by said radio receiving means, reading the second identification code out of said external memory means to compare the first identification code detected by said radio receiving means with said read out second identification code, said control means further including means for reading at least one identification code out of said external memory means to compare said one identification code with said second identification code for rechecking, only upon the detection of a coincidence between the second identification code detected by said radio receiving means and said first identification code.

7. A radio telecommunication apparatus having power source means comprising:
control means including internal memory means to which random access is gained;
external memory means, provided independently of the control means, for storing a first identification code; and
radio receiving means for receiving a signal coming via a radio channel and for detecting a second identification code which is contained in the received signal, wherein
said control means comprises means for, upon the first detection of the second identification code by the radio receiving means following the turning ON of said power source means, reading the first identification code out of said external memory means to compare the second identification code detected by said radio receiving means with the read-out first identification code, thereby confirming a first coincide between said first and second identification codes and for transferring said first identification code to said internal memory means and for holding said first identification code there, and means for, upon each subsequent detection of the second identification code by said radio receiving means, reading the first identification code out of said internal memory means to compare the second identification code detected by said radio receiving means with the read-out first identification code, thereby confirming a second coincide between said first and second identification codes, said control means further including means reading at least one identification code out of said external memory means to compare said one identification code with said second identification code for rechecking, only upon the detection of a coincidence between the second identification code detected by said radio receiving means and said first identification code.

8. A method for checking and rechecking identification code, comprising the step of:

(1) reading, from external memory means, a first identification code prior to the reception of a signal coming via a radio channel and transferring the first identification code to internal memory means and holding the first identification code there;

(2) receiving the signal and detecting a second identification code which is contained in the signal;

(3) upon the detection of the second identification code at step (2), reading from said internal memory means said first identification code;

(4) comparing the detected second identification code with the first identification code which is read out at step (3) to confirm a coincide between said first and second identification codes; and (5) reading at least one identification code out of said external memory means, upon the detection of the coincidence between the second identification code detected by said radio receiving means and said first identification code, to compare said one identification code with said second identification code for rechecking.

* * * * *

UNITED STATES PATENT AND TRADEMARK OFFICE
CERTIFICATE OF CORRECTION

PATENT NO. : 5,109,537
DATED     : April 28, 1992
INVENTOR(S) : Akio Toki

It is certified that error appears in the above-identified patent and that said Letters Patent is hereby corrected as shown below:

On the title page: Item [54]

The title is incorrect, should be, --RADIO TELECOMMUNICATION APPARATUS HAVING AN ID RECHECKING FUNCTION--.

Signed and Sealed this

Thirteenth Day of July, 1993

Attest:

MICHAEL K. KIRK

Attesting Officer

Acting Commissioner of Patents and Trademarks